United States Patent
Matsuno et al.

(10) Patent No.: US 9,834,219 B2
(45) Date of Patent: Dec. 5, 2017

(54) VEHICLE AUTOMATIC DRIVING CONTROL APPARATUS

(71) Applicant: SUBARU CORPORATION, Tokyo (JP)

(72) Inventors: Koji Matsuno, Tokyo (JP); Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/253,165

(22) Filed: Aug. 31, 2016

(65) Prior Publication Data

US 2017/0072963 A1    Mar. 16, 2017

(30) Foreign Application Priority Data

Sep. 11, 2015    (JP) .................................. 2015-179774

(51) Int. Cl.
  *B60W 30/18*    (2012.01)
(52) U.S. Cl.
  CPC ................ *B60W 30/18172* (2013.01); *B60W 2510/0661* (2013.01); *B60W 2550/148* (2013.01); *B60W 2710/085* (2013.01)
(58) Field of Classification Search
  CPC ... B60W 30/18172; B60W 2510/0661; B60W 2550/148; B60W 2710/085
  See application file for complete search history.

(56) References Cited

U.S. PATENT DOCUMENTS 5,765,657 A * 6/1998 Fukumura .............. B60K 28/16
                                                      180/197

FOREIGN PATENT DOCUMENTS

| JP | 2008-019808 A | 1/2008 |
|---|---|---|
| JP | 2009-067358 A | 4/2009 |
| JP | 2010-31849 A | 2/2010 |

* cited by examiner

*Primary Examiner* — Michael D Lang
(74) *Attorney, Agent, or Firm* — McDermott Will & Emery LLP (57) ABSTRACT

A vehicle automatic driving control apparatus executes an automatic traveling control by performing setting on preset automatic-driving-required drive torque as target torque, and includes a traction-control-required drive torque setting unit that sets, when a preset operating condition of a traction control is satisfied, traction-control-required drive torque as the target torque to decrease drive torque and thereby suppress a drive wheel slip, an automatic-driving-required drive torque decreasing unit that gradually decreases, based on a preset amount, the automatic-driving-required drive torque when the traction control is operated, a torque comparing unit that compares the traction-control-required drive torque with the decreased automatic-driving-required drive torque, and an automatic-driving-required drive torque setting unit that completes the traction control and performs the setting again on the decreased automatic-driving-required drive torque as the automatic-driving-required drive torque for the automatic driving control, when the traction-control-required drive torque is determined as exceeding the decreased automatic-driving-required drive torque.

13 Claims, 4 Drawing Sheets

VEHICLE AUTOMATIC DRIVING CONTROL APPARATUS

CROSS-REFERENCE TO RELATED APPLICATIONS

The present application claims priority from Japanese Patent Application No. 2015-179774 filed on Sep. 11, 2015, the entire contents of which are hereby incorporated by reference.

BACKGROUND

The technology relates to a vehicle automatic driving control apparatus having a traction control (or a traction control system; the traction control may be hereinafter abbreviated to TCS) that suppresses a slip of drive wheels.

In recent years, automatic driving control apparatuses for vehicles have been developed and put into practical use to allow drivers to drive more comfortably. Such an automatic driving control apparatus may recognize a travelling environment and obtain traveling information of an own vehicle to perform automatic driving. Upon an occurrence of a slip of drive wheels in a vehicle operable to perform such automatic driving, TCS may be used to suppress the slip. For example, reference is made to Japanese Unexamined Patent Application Publication (JP-A) No. 2010-31849.

SUMMARY

In general, what is desired in a vehicle automatic driving control apparatus is to achieve proper automatic driving.

It is desirable to provide a vehicle automatic driving control apparatus that makes it possible to achieve proper automatic driving.

An aspect of the technology provides a vehicle automatic driving control apparatus that obtains traveling environment information and traveling information of an own vehicle, and executes an automatic traveling control by performing setting on preset automatic-driving-required drive torque as target torque. The automatic-driving-required drive torque is drive torque required for automatic driving. The vehicle automatic driving control apparatus includes: a traction-control-required drive torque setting unit that sets, when a preset operating condition of a traction control is satisfied, traction-control-required drive torque as the target torque to decrease drive torque of the own vehicle and thereby suppress a slip of a drive wheel of the own vehicle, in which the traction-control-required drive torque is drive torque required for the traction control; an automatic-driving-required drive torque decreasing unit that gradually decreases, based on a preset decreasing amount, the automatic-driving-required drive torque when the traction control is operated; a torque comparing unit that compares the traction-control-required drive torque set by the traction-control-required drive torque setting unit with the automatic-driving-required drive torque decreased by the automatic-driving-required drive torque decreasing unit; and an automatic-driving-required drive torque setting unit that completes the traction control and performs the setting again on the decreased automatic-driving-required drive torque as the automatic-driving-required drive torque for the automatic driving control, when the traction-control-required drive torque is determined by the torque comparing unit as exceeding the decreased automatic-driving-required drive torque.

DETAILED DESCRIPTION

In the following, some implementations of the technology are described in detail with reference to the accompanying drawings.

Figure 1:
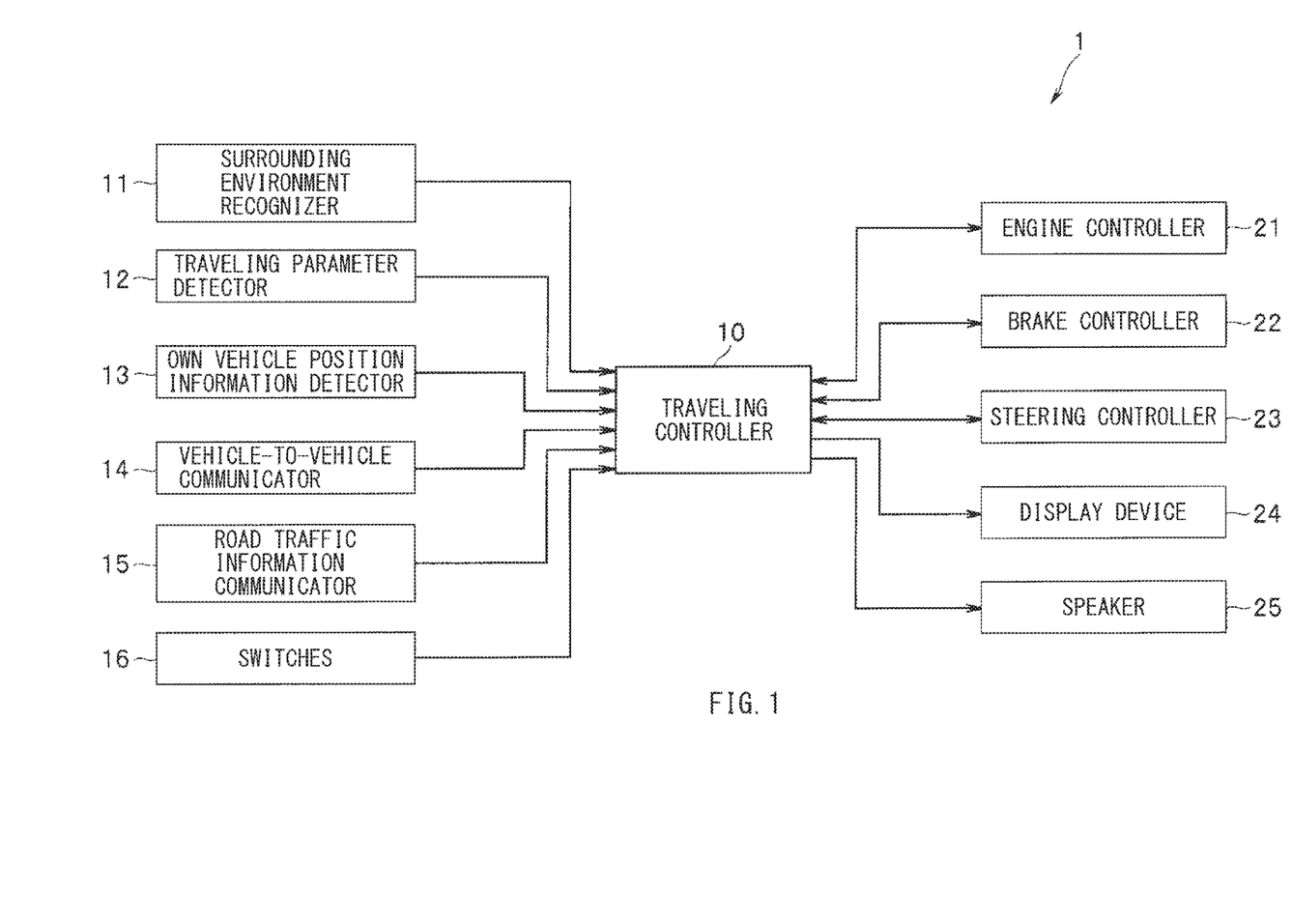
FIG. 1 illustrates an overall configuration of a vehicle automatic driving control apparatus according to one implementation of the technology.

Referring to FIG. 1, a vehicle automatic driving control apparatus 1 may include a traveling controller 10. The vehicle automatic driving control apparatus 1 may include, as input devices, a surrounding environment recognizer 11, a traveling parameter detector 12, an own vehicle position information detector 13, a vehicle-to-vehicle communicator 14, a road traffic information communicator 15, and switches 16. The vehicle automatic driving control apparatus 1 may include, as output devices, an engine controller 21, a brake controller 22, a steering controller 23, a display device 24, and a speaker 25. The speaker 25 as used herein encompasses a buzzer. The input devices and the output devices may be coupled to the traveling controller 10.

The surrounding environment recognizer 11 may include a camera and a reflected wave receiver which are unillustrated. The camera may have a solid-state imaging device, etc. The camera may be provided in a vehicle interior, and may capture an image of an environment outside a vehicle to obtain image information. The camera may be, for example but not limited to, a stereo camera, a monocular camera, or a color camera. The reflected wave receiver may be one or both of, for example but not limited to, radar and sonar. The radar and the sonar each may receive a reflected wave derived from a three-dimensional object present around the vehicle. The radar may be, for example but not limited to, laser radar or millimeter-wave radar.

The surrounding environment recognizer 11 may perform, for example but not limited to, a grouping process on distance information, based on the image information obtained by the camera. The surrounding environment recognizer 11 may then compare the distance information having been subjected to the grouping process with three-dimensional road shape data, three-dimensional object data, etc., which are set in advance. By making the comparison, the surrounding environment recognizer 11 may extract, for example but not limited to, data on lane lines, data on sidewall present along a road such as a guardrail and a curb, and the data on three-dimensional object such as a vehicle. The surrounding environment recognizer 11 may extract the pieces of data, together with a position relative to the own vehicle and a speed. The relative position may include, for example but not limited to, a distance and an angle. The surrounding environment recognizer 11 may also detect a position of a three-dimensional object from which the reflected wave is reflected, based on information on the reflected wave obtained from the radar or any other reflected wave receiver. The surrounding environment recognizer 11 may detect the position at which the three-dimensional object is present together with a speed. The position may include, for example but not limited to, a distance and an angle.

The traveling parameter detector 12 may obtain traveling information of the own vehicle. The traveling information may include factors such as, but not limited to, a wheel speed of each wheel, a vehicle speed, steering torque, a steering wheel angle, a yaw rate, an accelerator position, a throttle position, a gradient of a road surface on which the own vehicle travels, and an estimate on a friction coefficient of the road surface (a road surface friction coefficient μ).

The own vehicle position information detector 13 may be, for example but not limited to, a navigation system. The own vehicle position information detector 13 may receive an electric wave transmitted from, for example but not limited to, a global positioning system (GPS), and detect a current position, based on information on the received electric wave. By detecting the current position, the own vehicle position information detector 13 may identify a position of the own vehicle on map data. The map data may be stored in advance on a recording medium such as, but not limited to, a flash memory, a compact disc (CD), a digital versatile disc (DVD: Registered Trademark), a Blu-ray (Registered Trademark) disc, and a hard disk drive (HDD).

The map data stored in advance may include road data and facility data. The road data may include, for example but not limited to, information on directions of links, information on positions of the links, information on types of the links, information on positions of nodes, information on types of the nodes, and information on a relationship in connection between the nodes and the links. In other words, the road data may include information on branching and a junction of a road, information on a maximum vehicle speed at a branch road, and any other information. The facility data may include a plurality of records for each facility. The records each may include data that indicates, for example but not limited to, information on name of a relevant facility, information on a location of the facility, and information on a type of the facility which may be classified into a department store, a store, a restaurant, a parking lot, a park, and a place for repairing upon a vehicle malfunction. The own vehicle position information detector 13 may display the position of the own vehicle on the map, and allow an operator to input a destination. Upon the input of the destination by the operator, the own vehicle position information detector 13 may perform a predetermined calculation on a route from the place of departure to the destination. The own vehicle position information detector 13 may display the calculated route on the display device 24 such as, but not limited to, a display and a monitor, and may guide a driver by voice by means of the speaker 25 to allow for full command of guidance.

The vehicle-to-vehicle communicator 14 may be a short-range wireless communicator that may have a communication area of about 100 meters, such as, hut not limited to, a wireless local area network (LAN). The vehicle-to-vehicle communicator 14 may perform communication with any other vehicle directly without any intervention of a server, etc., to transmit and receive information. The vehicle-to-vehicle communicator 14 may exchange information such as, but not limited to, vehicle information, traveling information, and traffic environment information with any other vehicle through the mutual communication with that vehicle. The vehicle information may include, for example but not limited to, unique information that indicates a type of a vehicle such as, but not limited to, a passenger car, a truck, and a motorcycle in one implementation. The traveling information may include, for example but not limited to, vehicle speed information, position information, information on lighting of stop lamps, information on blinking of blinkers upon right turn and left turn, and information on blinking of hazard lights upon emergency stop. The traffic environment information may include information subjected to change from situation to situation such as, but not limited to, information on traffic jam and information on construction.

The road traffic information communicator 15 may be a so-called Vehicle Information and Communication System (VICS: Registered Trademark) or any other suitable system that receives information on road traffic. The road traffic information communicator 15 may receive the road traffic information on a real-time basis through an FM multiplex broadcast or from a transmitter on a road, and display the received road traffic information on the previously-stored map data described above. The road traffic information may include information on, for example but not limited to, traffic jam, accident, construction, required time, and parking lot.

The switches 16 may be those related to a driving assistant control for the driver. Non-limiting examples of the switches 16 may include: a switch that performs a constant speed traveling control in which a speed is set to a preset constant speed; a switch that performs a follow-up control in which an inter-vehicle distance or inter-vehicle tune between the own vehicle and a preceding vehicle is kept to a preset constant value; a switch that performs a lane-keeping control in which a traveling lane is kept to a preset lane to carry out a traveling control; a switch that performs a control which prevents an occurrence of deviation from the traveling lane; a switch that allows for execution of an overtaking control which allows the own vehicle to overtake the preceding vehicle or a vehicle to be overtaken; a switch that executes an automatic driving control which causes some or all of the controls described above to be performed in a coordinated manner; a switch that sets factors necessary for each of the controls described above, including a vehicle speed, an inter-vehicle distance, inter-vehicle time, and a speed limit without limitation; and a switch that deactivates any or all of the controls described above.

The engine controller 21 may perform a principal control related to an unillustrated engine of the vehicle, based on the vehicle information. The principal control may include, for example but not limited to, a fuel injection control, an ignition timing control, and an electronic throttle control. The vehicle information may be directed to, for example but not limited to, an intake airflow, a throttle position, an engine water temperature, an intake temperature, a concentration of oxygen, a crank angle, and an accelerator position. Further, the engine controller 21 may receive, from the traveling controller 10, information on automatic-driving-required drive torque as drive torque required for the automatic driving. Non-limiting examples of the automatic-driving-required drive torque may include drive torque required for performing traveling at a vehicle speed previously set by the driver, drive torque upon avoiding an obstacle, etc., and drive torque upon overtaking the preceding vehicle. The engine controller 21 may perform a control in which the automatic-driving-required drive torque is set as target torque. Upon operation of the TCS, the engine controller 21 may receive, from the traveling controller 10, TCS-required drive torque as drive torque required for the TCS, and perform a control in which the TCS-required drive torque is set as the target torque.

The brake controller 22 may allow for a control of unillustrated brake devices of four wheels independently from a braking operation performed by the driver, and may perform a antilock brake system (ABS) control and a yaw brake control that controls a yaw moment to be applied to the vehicle. The brake controller 22 may perform these controls, based on the vehicle information that may be directed to, for example but not limited to, a brake switch, the wheel speed of each of the four wheels, the steering wheel angle, and the yaw rate. The yaw brake control, may include, for example but not limited to, an antiskid control.

The steering controller 23 may control assist torque to be obtained from an unillustrated electric power steering motor provided in a steering system of the vehicle, based on the vehicle information that may be directed to, for example but not limited to, the vehicle speed, the steering torque, the steering wheel angle, and the yaw rate. The steering controller 23 may allow for the lane-keeping control in which the traveling lane is kept to the preset lane to carry out the traveling control, the lane deviation prevention control that prevents the occurrence of deviation from the traveling lane, and an automatic driving and steering control that causes some or all of the controls described above to be performed in a coordinated manner. The steering controller 23 may receive, from the traveling controller 10, information on the steering angle, a target steering wheel angle, or the steering torque necessary for the lane-keeping control, the lane deviation prevention control, and the automatic driving and steering control calculated by the traveling controller 10, and may control driving of the electric power steering motor in accordance with a control amount of the steering angle, the target steering wheel angle, or the steering torque received from the traveling controller 10.

The display device 24 may provide the driver with visual alerting or visual notification, by means of, for example but not limited to, the display, the monitor, or an alarm lamp. The speaker 25 may provide the driver with aural alerting or aural notification.

The traveling controller 10 may perform, based on input signals received from the surrounding environment recognizer 11, the traveling parameter detector 12, the own vehicle position information detector 13, the vehicle-to-vehicle communicator 14, the road traffic information communicator 15, and the switches 16 described above, the controls in a coordinated manner to execute the automatic driving control, etc. The controls may include, for example but not limited to, a collision prevention control that prevents the own vehicle from colliding with an obstacle, etc., the constant speed traveling control, the follow-up traveling control, the lane-keeping control, the lane deviation prevention control, and the traction control (TCS).

Figure 2:
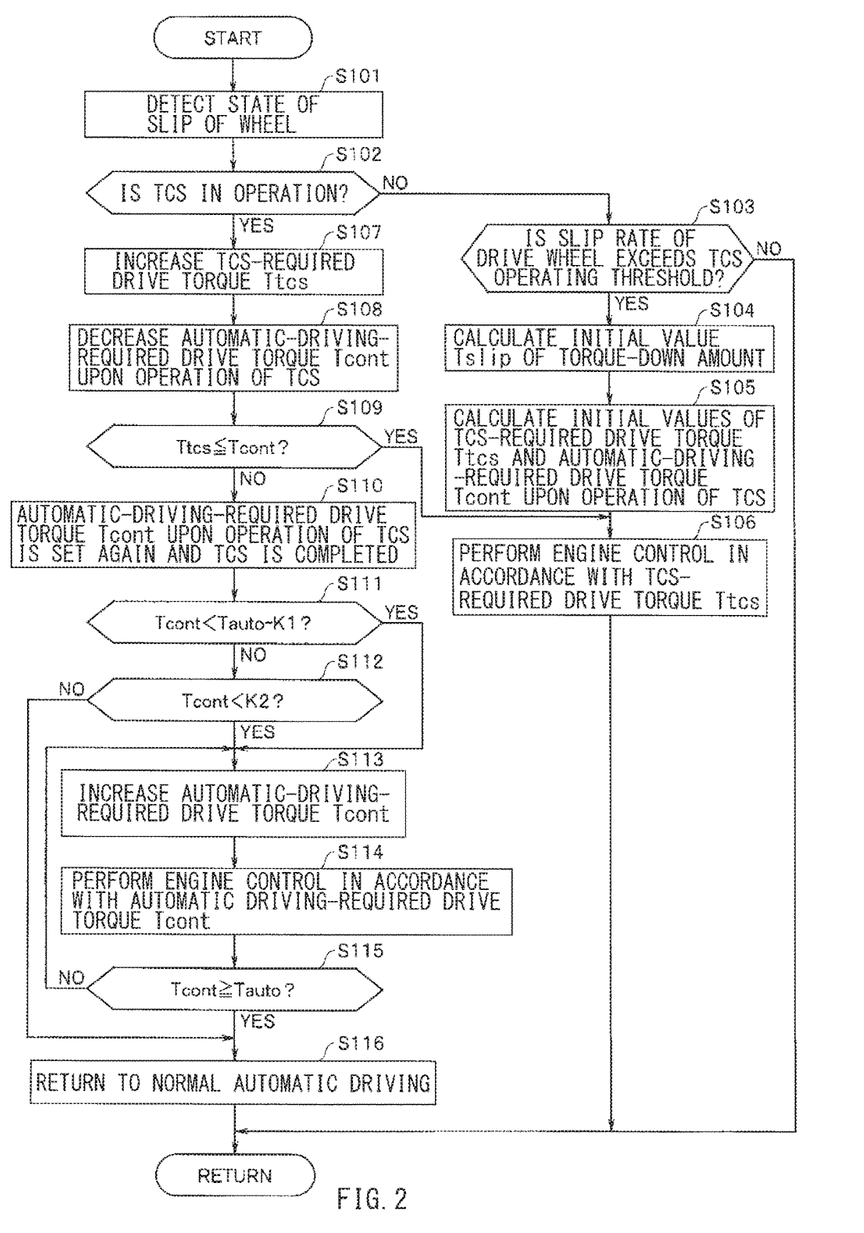
FIG. 2 is a flowchart of a program of a traction control according to one implementation of the technology.

A description is given next, with reference to the flowchart of FIG. 2, of an example of the traction control (TCS) to be executed by the traveling controller 10. The TCS according to one implementation may operate when a slip rate of a drive wheel exceeds a threshold, i.e., a TCS operating threshold.

In step (hereinafter simply abbreviated to "S") 101, a state of a slip of each wheel may be detected first. In one specific but non-limiting example, the slip rate of each wheel may be calculated based on a difference between a reference vehicle speed and the wheel speed of each wheel. The reference vehicle speed may be a wheel speed of a driven wheel.

Thereafter, a flow may proceed to S102 in which a determination may be made as to whether the TCS is in operation.

When a result of the determination in S102 indicates that the TCS is no operation, the flow may proceed to S103 in which a determination may be made as to whether the slip rate of the drive wheel exceeds the TCS operating threshold. When the slip rate of the drive wheel is equal to or less than the TCS operating threshold, the program may be finished without causing the TCS to operate.

When the slip rate of the drive wheel exceeds the TCS operating threshold, the flow may proceed to S104 in order to operate the TCS. In S104, an initial value Tslip of a torque-down amount may be calculated from, for example, the following expression (1):

$$T\text{slip} = IE \cdot (d\omega\text{slip}/dt) \tag{1}$$

where Ie is equivalent inertia of a drive system and dcoslip is the speed of rotation of the drive system.

Thereafter, the flow may proceed to S105 in which an initial value of the TCS-required drive torque Ttcs and an initial value of the automatic-driving-required drive torque Tcont upon the operation of the TCS may be calculated respectively from, for example, the following expressions (2) and (3):

$$T\text{tcs} = T\text{auto} - T\text{slip} \tag{2}$$

$$T\text{cont} = T\text{auto} \tag{3}$$

where Tauto is the automatic-driving-required drive torque that is the drive torque required for the automatic driving and set before the operation of the TCS. Non-limiting examples of the automatic-driving-required drive torque Tauto may include the drive torque necessary for performing the traveling at the vehicle speed previously set by the driver and the drive torque upon overtaking the preceding vehicle.

Thereafter, the flow may proceed to S106 in which the TCS-required drive torque Ttcs may be outputted to the engine controller 21 and an engine control may be performed in accordance with the TCS-required drive torque Ttcs. The program may finish following S106.

When the result of the determination in S102 indicates that the TCS is in operation, the flow may proceed to S107 in which the TCS-required drive torque Tics may be increased based on, for example, the following expression (4):

$$T\text{tc}(t) = T\text{tcs}(t-1) + \Delta T\text{tcs} \tag{4}$$

where ΔTtcs is a predetermined amount of returning the TCS-required drive torque Ttcs, and may be a fixed value, or an amount set in accordance with the slip amount or any other factor. Note that a subscript (t) in the expression (4) denotes that the TCS-required drive torque Ttcs with (t) is based on a current value. A subscript (t−1) in the expression (4) denotes that the TCS-required drive torque Ttcs with (t−1) is based on a previous value.

Figure 3:
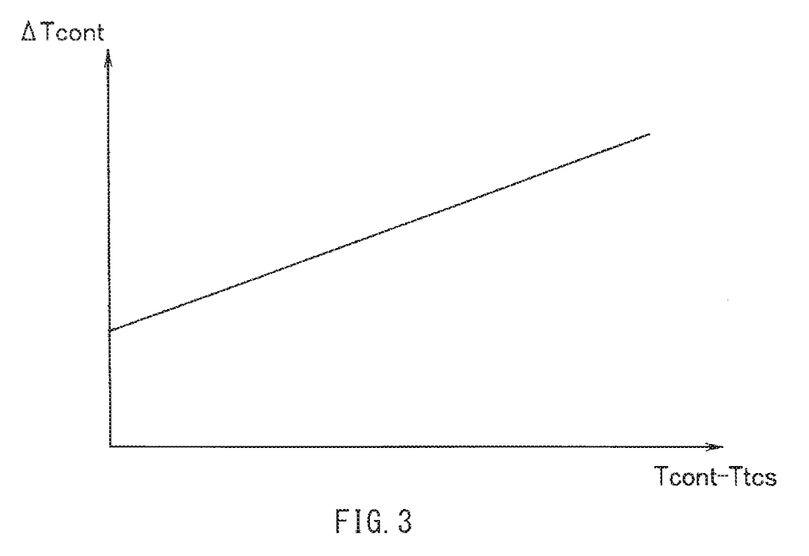
FIG. 3 describes an example of a characteristic of a decreasing amount that decreases automatic-driving-required drive torque upon operation of TCS according to one implementation of the technology.

Thereafter, the flow may proceed to S108 in which the automatic-driving-required drive torque Tcont upon the operation of the TCS may be decreased based on, for example, the following expression (5):

$$T\text{cont}(t) = T\text{cont}(t-1) - \Delta T\text{cont} \tag{5}$$

where ΔTcont is a preset decreasing amount that decreases the automatic-driving-required drive torque Tcont upon the operation of the TCS, and may be set by referring to a map as illustrated by way of example in FIG. 3. Note that a subscript (t) in the expression (5) denotes that the automatic-driving-required drive torque Tcont with (t) is based on a current value. A subscript (t−1) in the expression (5) denotes that the automatic-driving-required drive torque Tcont with (t−1) is based on a previous value. In one specific but non-limiting example, the decreasing amount ΔTcont may be set based on a difference between the previous TCS-required drive torque Ttcs(t−1) and the previous automatic-driving-required drive torque Tcont(t−1) upon the operation of the TCS. The decreasing amount ΔTcont may be set to a larger value as the difference becomes larger so that the automatic-driving-required drive torque Tcont upon the operation of the TCS promptly approaches the TCS-required drive torque Ttcs.

Thereafter, the flow may proceed to S109 in which the TCS-required drive torque Ttcs may be compared with the automatic-driving-required drive torque Tcont upon the operation of the TCS. When the TCS-required drive torque Ttcs is equal to or less than the automatic-driving-required drive torque Tcont upon the operation of the TCS (when Ttcs≤Tcont), the flow may proceed to S106 in which the TCS-required drive torque Ttcs may be outputted to the engine controller 21 and the engine control may be performed in accordance with the TCS-required drive torque Ttcs. The program may finish following S106.

When the TCS-required drive torque Ttcs exceeds the automatic-driving-required drive torque Tcont upon the operation of the TCS (when Ttcs>Tcont), the flow may proceed to S110. In S110, the automatic-driving-required drive torque Twig upon the operation of the TCS may be set again as the automatic-driving-required drive torque, and the TCS may be completed.

Thereafter, the flow may proceed to S111 in which the automatic-driving-required drive torque Tcont having been set again in S110 may be compared with a reference value. The reference value (Tauto−K1) may be a value that is smaller, by a preset value K1, than automatic-driving-required drive torque Tauto before the operation of the TCS.

The flow may proceed to S112 when a result of the comparison in S111 indicates that the automatic-driving-required drive torque Tcont having been set again is equal to or greater than the reference value defined as Tauto−K1 (when Tcont≥Tauto−K1). The flow may proceed to S113 when the result of the comparison in S111 indicates that the automatic-driving-required drive torque Tcont having been set again is less than the reference value defined as Tauto−K1 (when Tcont<Tauto−K1).

In S112 following the determination in S111 that the automatic-driving-required drive torque Tcont is equal to or greater than the reference value (when Tcont≥Tauto−K1), the automatic-driving-required drive torque Tcont having been set again may be compared with a preset threshold K2.

The flow may proceed to S113 when a result of the determination in S112 indicates that the automatic-driving-required drive torque Tcont having been set again is less than the preset threshold K2 (when Tcont<K2). The flow may proceed to S116 when the result of the determination in S112 indicates that the automatic-driving-required drive torque Tcont having been set again is equal to or greater than the preset threshold K2 (when Tcont≥K2).

Figure 4:
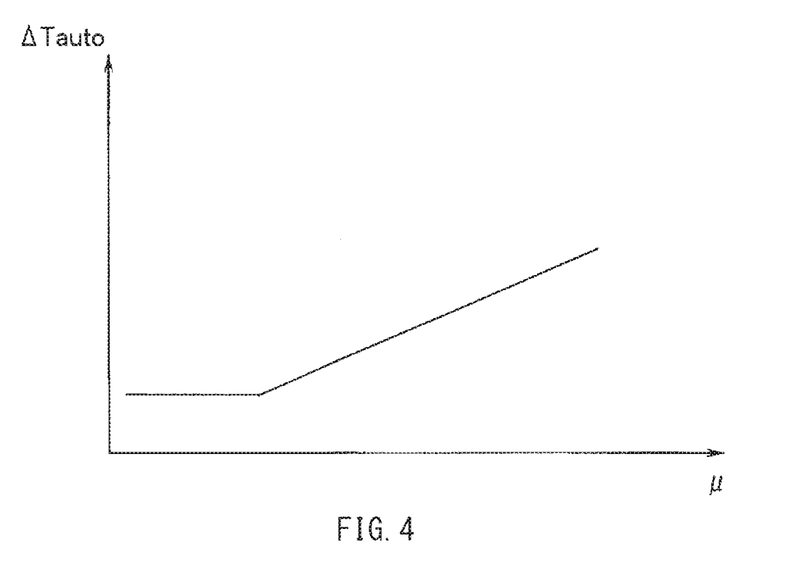
FIG. 4 describes an example of a characteristic of an increasing amount that increases the automatic-driving-required drive torque that has been set again according to one implementation of the technology.

In S113 following the determination in S111 that the automatic-driving-required drive torque Tcont having been set again is less than the reference value defined as Tauto−K1 (when Tcont<Tauto−K1) or following the determination in S112 that the automatic-driving-required drive torque Tcont having been set again is less than the preset threshold K2 (when Tcont<K2), the automatic-driving-required drive torque Tcont having been set again may be increased by, for example, the following expression (6):

$$Tcont = Tcont + \Delta Tauto \tag{6}$$

where ΔTauto is a preset increasing amount that increases the automatic-driving-required drive torque Tcont having been set again, and may be set by referring to a map as illustrated by way of example in FIG. 4. In one specific but non-limiting example, the increasing amount ΔTauto may be set to a smaller value as the road surface friction coefficient μ becomes smaller so that the drive torque returns gently.

Thereafter, the flow may proceed to S114 in which the automatic-driving-required drive torque Tcont having been set again may be outputted to the engine controller 21 and the engine control may be performed in accordance with the automatic-driving-required drive torque Tcont having been set again.

Thereafter, the flow may proceed to S115 in which the automatic-driving-required drive torque Tcont having been set again may be compared with the automatic-driving-required drive torque Tauto that is necessary for the automatic driving in a current situation. When the automatic-driving-required drive torque Tcont having been set again is equal to or greater than the automatic-driving-required drive torque Tauto that is necessary for the automatic driving in the current situation (Tcont≥Tauto), the flow may proceed to S116 in which the process may return to the normal automatic driving. In other words, the automatic-driving-required drive torque Tauto may be outputted to the engine controller 21 and the engine control may be performed in accordance with the automatic-driving-required drive torque Tauto. When the automatic-driving-required drive torque Tcont having been set again is less than the automatic-driving-required drive torque Tauto that is necessary for the automatic driving in the current situation (Tcont<Tauto), the processes from S113 may be repeated.

When both S111 and S112 are satisfied, i.e., when the determination is made in S111 that the automatic-driving-required drive torque Tcont having been set again is equal to or greater than the reference value defined as Tauto−K1 (when Tcont≥Tauto−K1) and the determination is made in S112 that the automatic-driving-required drive torque Tcont having been set again is equal to or greater than the preset threshold K2 (when Tcont≥K2), the flow may proceed to S116. In S116, the automatic-driving-required drive torque Tcont having been set again may be outputted to the engine controller 21 and the engine control may be performed in accordance with the automatic-driving-required drive torque Tcont having been set again. Accordingly, the traveling controller 10 may have functions as a traction-control-required drive torque setting unit, an automatic-driving-required drive torque decreasing unit, a torque comparing unit, and an automatic-driving-required drive torque setting unit.

Figure 5:
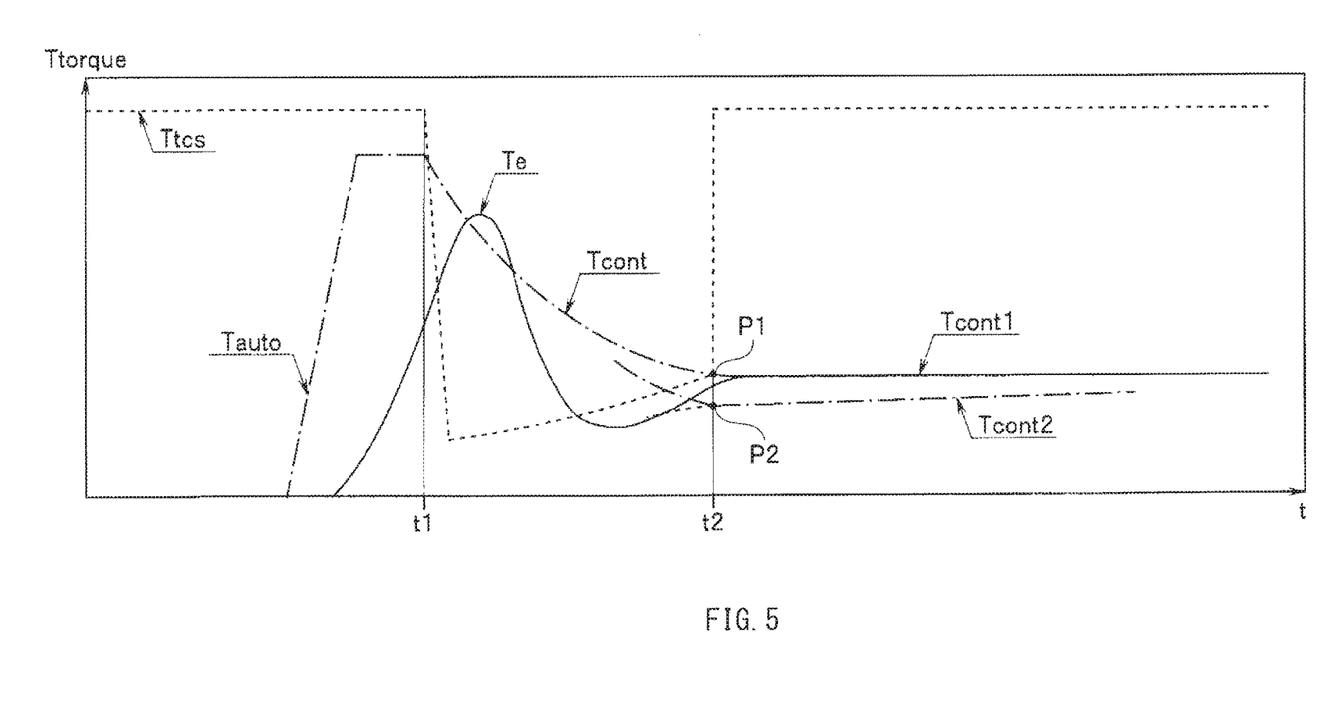
FIG. 5 is a time chart illustrating an example of the traction control according to one implementation of the technology.

A description is given, with reference to a time chart illustrated in FIG. 5, of a specific but non-limiting example of the foregoing traction control.

When the TCS operates at a time point t1, the TCS-required drive torque Ttcs may be decreased in torque down to the initial value as calculated from the foregoing expression (2).

At the time point t1, the initial value of the automatic-driving-required drive torque Tcont upon the operation of the TCS may also be set to the automatic-driving-required drive torque Tauto before the operation of the TCS, as calculated from the foregoing expression (3).

Thereafter, the TCS-required drive torque Ttcs may be gradually increased with elapse of time in accordance with the foregoing expression (4), whereas the automatic-driving-required drive torque Tcont upon the operation of the TCS may be gradually decreased in accordance with the foregoing expression (5).

Following the time point t1, a difference between the TCS-required drive torque Ttcs and the automatic-driving-required drive torque Tcont upon the operation of the TCS may become small gradually, whereby the decreasing amount ΔTcont of the automatic-driving-required drive torque Tcont upon the operation of the TCS may also become small gradually and thus the automatic-driving-required drive torque Tcont upon the operation of the TCS decreases gently.

When the time elapses to reach a time point t2 and the TCS-required drive torque Ttcs becomes greater than the automatic-driving-required drive torque Tcont upon the operation of the TCS (Ttcs>Tcont) at a point P1 in FIG. 5, the automatic-driving-required drive torque Tcont upon the operation of the TCS may be set again as the automatic-driving-required drive torque to complete the TCS. In other words, the TCS-required drive torque Ttcs may return to a value that is before the TCS-required drive torque Ttcs is decreased down in torque.

At the point P1, when the automatic-driving-required drive torque Tcont having been set again is equal to or greater than the reference value defined as Tauto−K1 (when Tcont≥Tauto−K1) and is equal to or greater than the preset threshold K2 (when Tcont≥K2), the automatic-driving-required drive torque Tcont upon the operation of the TCS may be maintained at the value that has been set again (denoted by "Tcont1" in FIG. 5), and the engine control may be executed in accordance with the automatic-driving-required drive torque Tcont1.

Meanwhile, when the time elapses to reach the time point t2 and the TCS-required drive torque Ttcs becomes greater than the automatic-driving-required drive torque Tcont upon the operation of the TCS (Ttcs>Tcont) at a point P2 in FIG. 5, the automatic-driving-required drive torque Tcont upon the operation of the TCS may likewise be set again as the automatic-driving-required drive torque to complete the TCS. In other words, the TCS-required drive torque Ttcs may return to a value that is before the TCS-required drive torque Ttcs is decreased down in torque. Note that the numeral reference Te indicates an actual engine torque at this time.

However, when the automatic-driving-required drive torque Tcont having been set again is low and is thus less than the reference value defined as Tauto−K1 (when Tcont<Tauto−K1) or is thus less than the preset threshold K2 (when Tcont<K2), the automatic-driving-required drive torque Tcont having been set again may be increased gently in accordance with the road surface friction coefficient μ as denoted by "Tcont2" in FIG. 5, until the automatic-driving-required drive torque Tcont having been set again reaches the automatic-driving-required drive torque Tauto that is necessary for the automatic driving in a current situation.

Accordingly, an vehicle automatic driving control apparatus according to one implementation of the technology obtains traveling environment information and traveling information of an own vehicle, and executes the automatic traveling control by performing setting on the preset automatic-driving-required drive torque as the target torque. When an operating condition of the TCS is satisfied, the TCS-required drive torque Ttcs is set as the target torque to decrease the drive torque of the own vehicle and thereby suppress the slip of the drive wheel of the own vehicle. The automatic-driving-required drive torque Tcont upon the operation of the TCS is gradually decreased based on the preset decreasing amount ΔTcont that decreases the automatic-driving-required drive torque Tcont upon the operation of the TCS. The TCS is completed and the setting is performed again on the decreased automatic-driving-required drive torque Tcont upon the operation of the TCS as the automatic-driving-required drive torque for the automatic driving control, when the TCS-required drive torque Ttcs exceeds the decreased automatic-driving-required drive torque Tcont upon the operation of the TCS (Ttcs>Tcont). Hence, the automatic-driving-required drive torque for the automatic driving is appropriately set even when the TCS is operated, preventing the TCS from operating again due to the excessive automatic-driving-required drive torque following the returning from the operation of the TCS. Thus, it is possible to prevent unnecessary repetition of the operation of the TCS and the returning from the operation of the TCS, and thereby to allow for smooth acceleration. Further, it is possible to suppress an occurrence of a slip by means of the TCS even when a road surface is slippery without causing discontinuation of the automatic driving due to the operation of the TCS, and thereby to continue the automatic driving.

Incidentally, in the event of a decrease in drive torque as a result of operation of TCS, if a driver drives a vehicle, the driver may ease up on an accelerator after the decrease in the drive torque, and may gradually press down on the accelerator with the aim of achieving the desired acceleration while searching for an accelerator position at which the TCS does not come into operation. However, during automatic driving, forcible completion control of the TCS, such as that disclosed in JP-A No. 2010-31849, does not function due to a throttle being opened in accordance with the target acceleration. Hence, in the automatic driving, the slip may possibly occur again following the gradual return of the drive torque owing to a normal TCS completion process, causing the TCS to come into operation again accordingly and thus raising a concern that smooth acceleration is inhibited due to repetition of the occurrence of the slip and the operation of the TCS. To address this concern, one method may be to detect a state of a road surface to adjust the target acceleration to be set in an automatic driving control. However, such a method is disadvantageous in that it is difficult to detect the state of the road surface favorably. It is also disadvantageous in that two controls that are different from each other in operation principle, namely, the setting of the target acceleration in the automatic driving control and the completion process of the TCS (i.e., the returning of the drive torque), may interfere with each other to cause acceleration failure, hunting, etc. Further, when the automatic driving is cancelled as a result of the operation of the TCS, the driver has to take over a driving operation suddenly, which may results in a concern, for example, that the driver may inadvertently press down on the accelerator.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle automatic driving control apparatus that obtains traveling environment information and traveling information of an own vehicle, and executes an automatic traveling control by performing setting on preset automatic-driving-required drive torque as target torque, the automatic-driving-required drive torque being drive torque required for automatic driving, the vehicle automatic driving control apparatus comprising:
   a traction-control-required drive torque setting unit that sets, when a preset operating condition of a traction control is satisfied, traction-control-required drive torque as the target torque to decrease drive torque of the own vehicle and thereby suppress a slip of a drive wheel of the own vehicle, the traction-control-required drive torque being drive torque required for the traction control;
   an automatic-driving-required drive torque decreasing unit that gradually decreases, based on a preset decreasing amount, the automatic-driving-required drive torque when the traction control is operated;
   a torque comparing unit that compares the traction-control-required drive torque set by the traction-control-required drive torque setting unit with the automatic-driving-required drive torque decreased by the automatic-driving-required drive torque decreasing unit; and
   an automatic-driving-required drive torque setting unit that completes the traction control and performs the setting again on the decreased automatic-driving-required drive torque as the automatic-driving-required drive torque for the automatic driving control, when the traction-control-required drive torque is determined by the torque comparing unit as exceeding the decreased automatic-driving-required drive torque,
   wherein the automatic-driving-required drive torque decreasing unit sets the decreasing amount, based on a difference between the traction-control-required drive torque set by the traction-control-required drive torque setting unit and the automatic-driving-required drive torque decreased by the automatic-driving-required drive torque decreasing unit.

2. The vehicle automatic driving control apparatus according to claim 1, wherein the automatic-driving-required drive torque setting unit sets the automatic-driving-required drive torque, having been set again by the automatic-driving-required drive torque setting unit, as the automatic-driving-required drive torque for the automatic driving control to continue the automatic driving, when the automatic-driving-required drive torque having been set again by the automatic-driving-required drive torque setting unit is equal to or more than both a preset threshold and a reference value, the reference value being smaller, by a preset value, than the automatic-driving-required drive torque that is before the operation of the traction control.

3. The vehicle automatic driving control apparatus according to claim 1, wherein the automatic-driving-required drive torque setting unit increases, based on a preset increasing amount, the automatic-driving-required drive torque having been set again by the automatic-driving-required drive torque setting unit, when the automatic-driving-required drive torque having been set again by the automatic-driving-required drive torque setting unit is less than a preset threshold or a reference value, the reference value being smaller, by a preset value, than the automatic-driving-required drive torque that is before the operation of the traction control.

4. The vehicle automatic driving control apparatus according to claim 3, wherein the automatic-driving-required drive torque setting unit variably sets, based on a friction coefficient of a road surface, the increasing amount that increases the automatic-driving-required drive torque having been set again by the automatic-driving-required drive torque setting unit.

5. A vehicle automatic driving control apparatus that obtains traveling environment information and traveling information of an own vehicle, and executes an automatic traveling control by performing setting on preset automatic-driving-required drive torque as target torque, the automatic-driving-required drive torque being drive torque required for automatic driving, the vehicle automatic driving control apparatus comprising:
   a traction-control-required drive torque setting unit that sets, when a preset operating condition of a traction control is satisfied, traction-control-required drive torque as the target torque to decrease drive torque of the own vehicle and thereby suppress a slip of a drive wheel of the own vehicle, the traction-control-required drive torque being drive torque required for the traction control;
   an automatic-driving-required drive torque decreasing unit that gradually decreases, based on a preset decreasing amount, the automatic-driving-required drive torque when the traction control is operated;
   a torque comparing unit that compares the traction-control-required drive torque set by the traction-control-required drive torque setting unit with the automatic-driving-required drive torque decreased by the automatic-driving-required drive torque decreasing unit; and
   an automatic-driving-required drive torque setting unit that completes the traction control and performs the setting again on the decreased automatic-driving-required drive torque as the automatic-driving-required drive torque for the automatic driving control, when the traction-control-required drive torque is determined by the torque comparing unit as exceeding the decreased automatic-driving-required drive torque,
   wherein the automatic-driving-required drive torque setting unit sets the automatic-driving-required drive torque, having been set again by the automatic-driving-required drive torque setting unit, as the automatic-driving-required drive torque for the automatic driving control to continue the automatic driving, when the automatic-driving-required drive torque having been set again by the automatic-driving-required drive torque setting unit is equal to or more than both a preset threshold and a reference value, the reference value being smaller, by a preset value, than the automatic-driving-required drive torque that is before the operation of the traction control.

6. The vehicle automatic driving control apparatus according to claim 5, wherein the automatic-driving-required drive torque setting unit increases, based on a preset increasing amount, the automatic-driving-required drive torque having been set again by the automatic-driving-required drive torque setting unit, when the automatic-driving-required drive torque having been set again by the automatic-driving-required drive torque setting unit is less than a preset threshold or a reference value, the reference value being smaller, by a preset value, than the automatic-driving-required drive torque that is before the operation of the traction control.

7. The vehicle automatic driving control apparatus according to claim 6, wherein the automatic-driving-required drive torque setting unit variably sets, based on a friction coefficient of a road surface, the increasing amount that increases the automatic-driving-required drive torque having been set again by the automatic-driving-required drive torque setting unit.

8. A vehicle automatic driving control apparatus that obtains traveling environment information and traveling information of an own vehicle, and executes an automatic traveling control by performing setting on preset automatic-driving-required drive torque as target torque, the automatic-driving-required drive torque being drive torque required for automatic driving, the vehicle automatic driving control apparatus comprising:
  a traction-control-required drive torque setting unit that sets, when a preset operating condition of a traction control is satisfied, traction-control-required drive torque as the target torque to decrease drive torque of the own vehicle and thereby suppress a slip of a drive wheel of the own vehicle, the traction-control-required drive torque being drive torque required for the traction control;
  an automatic-driving-required drive torque decreasing unit that gradually decreases, based on a preset decreasing amount, the automatic-driving-required drive torque when the traction control is operated;
  a torque comparing unit that compares the traction-control-required drive torque set by the traction-control-required drive torque setting unit with the automatic-driving-required drive torque decreased by the automatic-driving-required drive torque decreasing unit; and
  an automatic-driving-required drive torque setting unit that completes the traction control and performs the setting again on the decreased automatic-driving-required drive torque as the automatic-driving-required drive torque for the automatic driving control, when the traction-control-required drive torque is determined by the torque comparing unit as exceeding the decreased automatic-driving-required drive torque,
  wherein the automatic-driving-required drive torque setting unit increases, based on a preset increasing amount, the automatic-driving-required drive torque having been set again by the automatic-driving-required drive torque setting unit, when the automatic-driving-required drive torque having been set again by the automatic-driving-required drive torque setting unit is less than a preset threshold or a reference value, the reference value being smaller, by a preset value, than the automatic-driving-required drive torque that is before the operation of the traction control.

9. The vehicle automatic driving control apparatus according to claim 8, wherein the automatic-driving-required drive torque setting unit variably sets, based on a friction coefficient of a road surface, the increasing amount that increases the automatic-driving-required drive torque having been set again by the automatic-driving-required drive torque setting unit.

10. A vehicle automatic driving control apparatus that obtains traveling environment information and traveling information of an own vehicle, and executes an automatic traveling control by performing setting on preset automatic-driving-required drive torque as target torque, the automatic-driving-required drive torque being drive torque required for automatic driving, the vehicle automatic driving control apparatus comprising:
  circuitry configured to
    set, when a preset operating condition of a traction control is satisfied, traction-control-required drive torque as the target torque to decrease drive torque of the own vehicle and thereby suppress a slip of a drive wheel of the own vehicle, the traction-control-required drive torque being drive torque required for the traction control,
    gradually decrease, based on a preset decreasing amount, the automatic-driving-required drive torque when the traction control is operated,
    compare the traction-control-required drive torque with the decreased automatic-driving-required drive torque,
    complete the traction control and perform the setting again on the decreased automatic-driving-required drive torque as the automatic-driving-required drive torque for the automatic driving control, when the traction-control-required drive torque is determined as exceeding the decreased automatic-driving-required drive torque, and
    set the decreasing amount, based on a difference between the set traction-control-required drive torque and the decreased automatic-driving-required drive torque.

11. The vehicle automatic driving control apparatus according to claim 10, wherein the circuitry is further configured to set the automatic-driving-required drive torque, having been set again, as the automatic-driving-required drive torque for the automatic driving control to continue the automatic driving, when the automatic-driving-required drive torque having been set again is equal to or more than both a preset threshold and a reference value, the reference value being smaller, by a preset value, than the automatic-driving-required drive torque that is before the operation of the traction control.

12. The vehicle automatic driving control apparatus according to claim 10, wherein the circuitry is further configured to increase, based on a preset increasing amount, the automatic-driving-required drive torque having been set again, when the automatic-driving-required drive torque having been set again is less than a preset threshold or a reference value, the reference value being smaller, by a preset value, than the automatic-driving-required drive torque that is before the operation of the traction control.

13. The vehicle automatic driving control apparatus according to claim 10, wherein the circuitry is further configured to variably set, based on a friction coefficient of a road surface, the increasing amount that increases the automatic-driving-required drive torque having been set again.

* * * * *